(12) United States Patent
Baksh et al.

(10) Patent No.: US 7,537,742 B2
(45) Date of Patent: May 26, 2009

(54) PROCESS AND ADSORBENT FOR HYDROGEN PURIFICATION

(75) Inventors: Mohamed Safdar Allie Baksh, Amherst, NY (US); Mark William Ackley, East Aurora, NY (US); Frank Notaro, Amherst, NY (US)

(73) Assignee: Praxair Technology, Inc., Danbury, CT (US)

( * ) Notice: Subject to any disclaimer, the term of this patent is extended or adjusted under 35 U.S.C. 154(b) by 595 days.

(21) Appl. No.: 10/540,506

(22) PCT Filed: Dec. 22, 2003

(86) PCT No.: PCT/US03/40797

§ 371 (c)(1),
(2), (4) Date: May 12, 2006

(87) PCT Pub. No.: WO2004/058630

PCT Pub. Date: Jul. 15, 2004

(65) Prior Publication Data

US 2006/0254425 A1   Nov. 16, 2006

(51) Int. Cl.
*B01D 53/04*   (2006.01)
(52) U.S. Cl. .................. 423/230; 502/408; 502/410; 502/415; 423/239.1; 423/245.1; 423/247
(58) Field of Classification Search .................. 502/400, 502/407, 413, 414, 415, 416, 417, 439; 423/230, 423/239.1, 239.2, 245.1, 247
See application file for complete search history.

(56) References Cited

U.S. PATENT DOCUMENTS

| 3,430,418 | A | 3/1969 | Wagner |
| 3,564,816 | A | 2/1971 | Batta |
| 4,077,779 | A | 3/1978 | Sircar et al. |
| 4,176,090 | A | 11/1979 | Vaughan et al. |
| 4,553,981 | A | 11/1985 | Fuderer |
| 4,859,217 | A | 8/1989 | Chao |
| 4,957,514 | A | 9/1990 | Golden et al. |
| 5,152,975 | A | 10/1992 | Fong et al. |
| 5,174,979 | A | 12/1992 | Chao et al. |
| 5,413,625 | A | 5/1995 | Chao et al. |
| 5,454,857 | A | 10/1995 | Chao |
| 5,538,706 | A | 7/1996 | Kapoor et al. |
| 5,674,311 | A | 10/1997 | Notaro et al. |
| 5,698,013 | A | 12/1997 | Chao |
| 5,856,264 | A | 1/1999 | Cohen et al. |
| 5,912,422 | A | 6/1999 | Bomard et al. |
| 6,007,606 | A | 12/1999 | Baksh et al. |
| 6,027,548 | A | 2/2000 | Ackley et al. |
| 6,027,549 | A | 2/2000 | Golden et al. |
| 6,152,991 | A | 11/2000 | Ackley |
| 6,197,092 | B1 | 3/2001 | Butwell et al. |
| 6,302,943 | B1 | 10/2001 | Johnson et al. |
| 6,340,382 | B1 | 1/2002 | Baksh et al. |
| 6,402,813 | B2 | 6/2002 | Monereau et al. |
| 6,514,317 | B2 | 2/2003 | Hirano et al. |
| 2002/0183201 | A1 | 12/2002 | Barnwell et al. |

FOREIGN PATENT DOCUMENTS

EP       1 097 746 A2    5/2001
WO    WO 2004/058630    7/2004

OTHER PUBLICATIONS

Khelifa et al., "Sorption of Carbon Dioxide by Zeolite X Exchanged with $Zn^{2+}$ and $Cu^{2+}$", Microporous and Mesoporous Materials, vol. 32, p. 199-209, 1999.
Iyuke et al., "Application of Sn-Activated Carbon in Pressure Swing Adsorption for Purification of $H^{2}$", Chemical Engineering Science, vol. 55, p. 4745-4755, 2000.
Yang, "Gas Separation by Adsorption Processes", p. 51-52, 1987.

*Primary Examiner*—Edward M Johnson
(74) *Attorney, Agent, or Firm*—Salvatore P. Pace

(57) ABSTRACT

This invention discloses an optimum set of adsorbents for use in $H_2$-PSA processes. Each adsorbent bed is divided into four regions; Region 1 contains adsorbent for removing water; Region 2 contains a mixture of strong and weak adsorbents to remove bulk impurities like $CO_2$; Region 3 contains a high bulk density (>38 $lb_m/ft^3$) adsorbent to remove remaining $CO_2$; and most of $CH_4$ and CO present in $H_2$ containing feed mixtures; and Region 4 contains adsorbent having high Henry's law constants for the final cleanup of $N_2$ and residual impurities to produce hydrogen at the desired high purity.

10 Claims, 6 Drawing Sheets

US 7,537,742 B2

PROCESS AND ADSORBENT FOR HYDROGEN PURIFICATION

FIELD OF THE INVENTION

This invention relates to a pressure swing adsorption (PSA) system and process for purifying impure gas streams containing more than 50 mole % hydrogen, and more particularly to such a process for the production of high purity hydrogen from various hydrogen-containing feed mixtures such as synthesis gas. The improved process provides higher hydrogen recovery and lower adsorbent inventory as compared with previously disclosed PSA processes for hydrogen production.

BACKGROUND OF THE INVENTION

There is an increasing need for high purity hydrogen in the chemical process industries including steel annealing, silicon manufacturing, hydrogenation of fats and oils, glass making, hydrocracking, methanol production, the production of oxo alcohols, and isomerization processes. There are a variety of known processes wherein hydrogen is produced, including steam reforming of natural gas or naptha. In this process a feedstock such as natural gas is compressed and fed to a purification unit to remove sulfur compounds. The desulfurized feed is then mixed with superheated steam and fed to a reformer to produce primarily $H_2$ and CO. The effluent stream from the reformer is sent to a heat recovery unit, then to a shift converter to obtain additional $H_2$. The effluent from the shift converter passes through a process cooling and recovery unit prior to sending the effluent to a PSA system wherein high purity (e.g. 99.9 mol. % or greater) hydrogen is produced.

The $H_2$ gas being fed to PSA systems can, however, contain several contaminants in widely varying concentrations, (e.g. the feed stream to the PSA from a steam methane reformer (SMR) may contain one or more of $CO_2$, $CH_4$, CO and $N_2$. This combination of adsorbates at such widely varying compositions presents a significant challenge to the design of a PSA system, particularly with respect to adsorbent selection and configuration of the adsorber/adsorbent bed.

Representative prior art PSA processes include Sircar et al., U.S. Pat. No. 4,077,779; Fuderer et al., U.S. Pat. No. 4,553,981; Fong et al., U.S. Pat No. 5,152,975; Wagner, U.S. Pat No. 3,430,418 and Batta, U.S. Pat. No. 3,564,816.

More specifically, Bomard et al. in U.S. Pat. No. 5,912,422 discloses a PSA process for the separation of hydrogen from a feed gas mixture that contains CO and other impurities such as $CO_2$ and hydrocarbons. The feed mixture is passed into a first adsorbent to remove $CO_2$ and/or hydrocarbons, and then into a second adsorbent that is a faujasite type zeolite with at least 80% lithium exchange to remove primarily CO impurity to produce hydrogen. If $N_2$ is present in the hydrogen-containing feed mixture then Bomard et al., introduces a third adsorbent between the first and second adsorbent to remove nitrogen.

Golden et al., U.S. Pat. No. 4,957,514 disclosed the purification of hydrogen using barium exchanged Type X zeolite.

Golden at al., U.S. Pat. No. 6,027,549, disclose a PSA process to remove $CO_2$ and $CH_4$ using activated carbons having bulk densities in the range of approximately 35-38 lb/ft³.

Johnson et al., in U.S. Pat. No. 6,302,943 and in EP 1097746A2, disclose adsorbents for $H_2$ recovery by pressure and vacuum swing adsorption, wherein the adsorbents at the product end of the bed have Henry's Law constants between 0.8 and 2.2 mmol/g/atm for CO and between 0.55 to 1.40 mmol/g/atm $N_2$.

There remains a need for improved PSA system and process having lower adsorbent requirements and higher product recovery as compared to existing PSA systems and processes for hydrogen production.

The present invention addresses this need through the use of a novel selection and arrangement of adsorbents within the adsorbent bed.

SUMMARY OF THE INVENTION

In accordance with this invention, each adsorber (bed) of the H2-PSA system is divided into four regions. In a preferred embodiment the first region comprises an adsorbent for the removal of water from the feed stream. The second region functions to reduce high (>10% by vol.) level contaminants (e.g., $CO_2$) in the hydrogen containing feed to less than 10%. The third region comprises an adsorbent capable of reducing the concentrations of all impurities entering this layer to less than 1%. The fourth region consist of adsorbents having high Henry's Law constants for $N_2$ (e.g. greater than 1.5 mmol/gm bar and preferably greater than 2.3 mmol/gm bar) and CO (e.g. greater than 2.94 mmol/gm bar) to remove the remaining impurities to achieve the desired product ($H_2$) purity. In one embodiment the second region may be omitted and/or combined with the third region. Other embodiments are also disclosed.

BRIEF DESCRIPTION OF THE INVENTION the objects, features and advantages will occur to those skilled in the art from the following description of (a) preferred embodiment(s) and the accompanying drawing(s), in which.

DETAILED DESCRIPTION OF THE INVENTION

In accordance with the invention, an improved PSA system and process is provided for purifying a gas stream containing more than 50 mol. % hydrogen Typically $H_2$ feed gas to a PSA contains several contaminants, such as $H_2O$, $CO_2$, $CH_4$, CO, and $N_2$. As used herein, all gas component percentages are mol. % unless otherwise indicated. Such a combination of adsorbates at such widely varying compositions presents significant challenge to efficient adsorbent selection.

Figure 1:
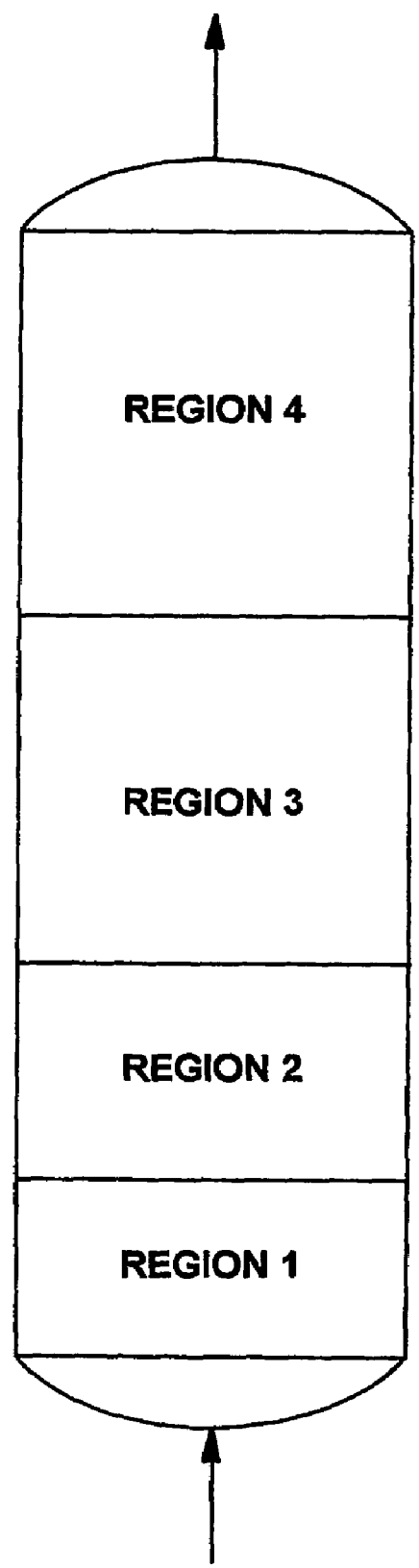
FIG. 1 illustrates a schematic of a four layered PSA adsorption column in accordance with a preferred embodiment of the invention.

A preferred embodiment of the invention is illustrated with reference to FIG. 1. In this embodiment, the PSA process uses an adsorbent bed comprising four regions of adsorbents. For the purposes of this disclosure, the first region is that which is closest to the feed end of the bed as indicated by the arrows indicating the direction of gas flow.

The first region of the bed comprises adsorbents to remove contaminants like water. The adsorbent for the first layer (first region) may be selected from the group consisting of alumina, silica gel, silicalite or zeolites.

The adsorbent for the second layer/region is utilized for the removal of $CO_2$ and some $CH_4$. In a preferred embodiment, this layer comprises activated carbon having a bulk density of 38-46 lb/ft$^3$ (measured by ASTM Standard D-2854), which may be mixed with a weaker adsorbent (for $CO_2$ and $CH_4$) such as alumina. The purpose of the mixture is to minimize the temperature gradient of the layer as well as the thermal swing associated with the heat of adsorption. The most preferred activated carbon is G2X activated carbon available from Takeda Chemical Industries, Japan.

With respect to the mixture, different fractions of alumina and activated carbon may be used. The optimum quantity of alumina and carbon for the mixture is dictated by the PSA process operating conditions, feed composition and the local gas phase concentration in the bed. Mixtures of other strong and weak adsorbents may also be used to achieve the desired reduction of thermal gradients in the bed. One such mixture could be activated carbon and ZnX zeolite or alumina and ZnX. Additional details on using mixtures of strong and weak adsorbents in PSA processes are disclosed by Ackley et al., U.S. Pat. No. 6,027,548.

The adsorbent for the third layer is utilized for the removal of residual $CH_4$ and the bulk of the $N_2$ and CO in the feed stream. A preferred adsorbent for this region is activated carbon having a bulk density greater than or equal to 38 lb/ft$^3$. As with layer 2, G2X activated carbon is the most preferred material. Cation exchanged forms of zeolites A, X, Y (e.g. ZnX and ZnY), chabazites and mordenite, and more particularly, X zeolite exchanged with $Zn^{2+}$ and $Cu^{2+}$ ions at different percentages of exchange may be used. The synthesis of $Zn^{2+}$ and $Cu^{2+}$ exchanged X zeolite is given by Khelifa et al., Microporous and Mesoporous Materials, Vol. 32, pg 199, 1999 and references therein. In addition, alternative materials for region 3 of the bed may include impregnated activated carbons having bulk densities in the range of 32-45 lb/ft$^3$. An example of one such impregnated activated carbon is Sn-activated carbon (Sn-AC). More specifically, the activated carbon is impregnated with about 35% $SnCl_2.2H_2O$ salt and then dried at 180° C. to produce $AC-SnO_2$. Additional information on the synthesis of Sn-activated carbons (Sn-AC) is given by Iyuke et al., Chemical Engineering Science, Vol. 55, pg 4745, 2000. Relatively less preferred materials are activated carbons for region 3 of the bed.

As indicated above, preferred adsorbents to be used in the second and third regions of the bed preferably have a high bulk density, in the range of 38-46 lb./ft$^3$. The use of such materials results in higher $H_2$ recovery (about a 10% improvement) over conventional processes and lower adsorbent inventory for the PSA process. Among the adsorbents having bulk density in the preferred range, adsorbents having the highest dynamic capacity for the contaminant should be chosen. For the purposes of this invention, the dynamic loading capacity is defined as is the difference between the loading under adsorption conditions and loading under desorption conditions.

Since regions 2 and 3 remove the majority of $CO_2$, CO, $CH_4$ and $N_2$ present in the $H_2$ containing feed mixture, the largest thermal gradients and thermal swings are present in those two regions of the bed, with region 2 having greater thermal gradients and thermal swings in the bed than region 3. Two mixture combinations of adsorbents were compared for region 2 of the bed. A lower density activated carbon (BPL, available from Calgon Carbon Corp. USA) having a density of less than 38 lb/ft$^3$ was also analyzed for comparison to G2X performance. The results are shown Table 1 below.

TABLE 1

Regions 2 and 3 (see FIG. 3) Temperature Swing and Dynamic Loadings of $CO_2$ and $CH_4$ on activated carbons (G2X & BPL), alumina, and mixtures of A201 alumina and G2X activated carbon.

| | Region 2: $CO_2/CH_4$ Zone | | | Region 3: $CH_4/N_2$ Zone | | |
|---|---|---|---|---|---|---|
| Adsorbent | ΔT (K) | Δ$CO_2$ mmol/g | Δ$CH_4$ mmol/g | ΔT (K) | Δ$CH_4$ Mmol/g | Δ$N_2$ mmol/g |
| G2X Carbon or ZnX | 25 | 1.06 | 0.087 | 5 | 0.019 | 0.027 |
| BPL Carbon | 25 | 0.84 | 0.056 | 4 | 0.019 | 0.022 |
| A201 Alumina | 8.7 | 0.41 | 0.0033 | 0.1 | 0.00045 | 0.0022 |
| NaY | 25 | 0.75 | 0.015 | 2 | 0.0069 | 0.016 |
| 75% G2X/25% A201 | 20 | 0.91 | 0.071 | — | — | — |
| 50% G2X/50% A201 | 16 | 0.77 | 0.054 | — | — | — |

Δ = delta

Table 1 clearly illustrates, that the adverse thermal gradient in region 2 of the bed is reduced significantly by mixing G2X carbon with a weaker adsorbent (e.g., alumina). As shown in Table 1, mixtures of G2X carbon and 25% or 50% A201 activated alumina (available from UOP, Des Plaines, Ill., USA) were evaluated to reduce thermal swings in the bed. The thermal swings were reduced from 25K for the G2X carbon alone to 20K and 16K for the respective mixtures. The delta $CO_2$ and delta $CH_4$ (loadings decreased 14% and 18%, respectively for the 75% carbon mixture. The dynamic loadings of the mixtures are higher than the simple weighted average of the adsorbent loadings due to the reduction in the adverse thermal swing, i.e. due to the lower heats of adsorption and the increased heat capacity provided by the higher density, weaker adsorbent. A secondary advantage of the use of a mixture in region 2 is the impact upon the base temperature in region 3. The delta $N_2$ and delta $CH_4$ loadings (not shown in Table 1) are about 10% higher due to the lower temperature in region 2 resulting from the mixture. Thus, in the most preferred practice of this invention, the second region consists of a mixture of a stronger and weaker adsorbents (e.g. a mixture of alumina and G2X activated carbon) to reduce the concentration of high level contaminants that are present in the $H_2$ containing feed mixture. By using a mixture of adsorbent in region 2, the reduced thermal swing actually increases the local dynamic capacity of the bed and reduces the adsorbent inventory required.

The final cleanup for $N_2$ and residual impurities (e.g., CO, $CH_4$, $O_2$, Ar) is done in region 4 of the bed. In accordance with the invention, the most preferred adsorbents for region four have a $N_2$ Henry's Law Constant between 2.58 mmol/g.bar and 10 mmol/g.bar, preferably between 2.58 and 4.3 mmol/g.bar. Adsorbents having a CO Henry's Law Constant of greater than 2.94 mmol/g.bar is also preferred. In the practice of the invention, adsorbents with high Henry's law constant achieve increased dynamic capacity, as well as lower bed pressure during equalization and purge steps in the PSA cycle. Consequently, higher $H_2$ recovery and lower bed size factor are achieved due to lower bed pressure prior to countercurrent (with respect to feed direction) blowdown in the PSA cycle. By using adsorbents with high Henry's constants in the purification zone of the bed, the spreading of the mass transfer zone is suppressed during the co-current pressure changing steps (e.g., bed-to-bed equalization) in the PSA cycle. The sharpness of the impurity concentration fronts lead to increase in recovery and lower adsorbent inventory. Grand Canonical Monte Carlo simulations indicate that adsorbents having the above Henry's Constant (>2.3 mmol/g.bar)

include CaEMT, CaMOR and LiMOR and absorbents with Henry's constant $\geq$1.5 mmol/g.bar such as VSA-6, Baylith KEH 650, KEJ407, CaX(2.0), LiX(2.0) (>86% Li), LiCaX (2.0) and binderless LiX(2.0) (>86% Li), where (2.0) refers to the $SiO_2/Al_2O_3$ ratio could be used, however adsorbents with Henry's Law constant >10 mmol/g.bar are generally not suitable in the practice of the invention. Note that the Henry's Law constant is based upon isotherm model and a specific temperature. The specific pressure only relates to the determination of the delta $N_2$ loading.

Alternative materials for region 4 include naturally occurring crystalline zeolite molecular sieves such as chabazite, erionite, clinoptilolite, and faujasite, and suitable synthetic zeolite molecular sieves such as ZSM-2, ZSM-3, EMC-2 (containing hexagonal faujasite possessing structure code EMT), beta, mordenite, heulandite, A, D, R, T, X, Y, and L. Also, other metal exchanged zeolites containing cations selected from group I ( e.g., Li, Na, K, Rb, Cs) and group II (e.g., Mg, Ca, Sr, and Ba) of the periodic table may also be used. In addition, zeolites A and X having at least 50% of its $AlO_2$ elements associated with cations chosen from the group formed by calcium, lithium, zinc, copper, manganese, magnesium, nickel, strontium and barium could be used in region 4 of the bed. Furthermore, mordenites exchanged with Li or Ca cations, EMT, FAU, MOR, and CaX could also be used the in the purification zone (region 4) of the bed to remove impurities such as $N_2$ and traces of $CH_4$, and CO to produce high purity $H_2$. The three letter codes identifying the tetrahedral frameworks are structure type codes assigned by the international Zeolite Association in accordance with rules set up by the IUPAC Commission on Zeolite Structure Types, W. M. Meier et al., $4^{th}$ Revised Edition, 1996. The most desired Si/Al ratios for the adsorbents selected for region 4 of the bed are as follows: CaA (Si/Al=1.0), LiX (Si/Al=1.25), LiX (Si/Al=1.0), CaX(Si/Al=1.25), CaX(Si/Al=1.0), Li-Mordenite (Si/Al=5.0), Ca-Mordenite (Si/Al=5.0) and CaEMT (Si/Al=1.0). In addition, zeolite containing lithium/alkaline earth metal A and X zeolites (Chao et al., U.S. Pat. Nos. 5,413,625; 5,174,979; 5,698,013; 5,454,857 and 4,859,217) may also be used in region 4 of this invention.

For the purpose of this application, the Henry's Law Constant is defined from the following equation representing a linear form of the isotherm in the low partial pressure region:

$$X_i = (X_{0_i} K_{H_i}) P_i$$

In evaluating the $N_2$ Henry's Law Constant ($X_0 K_H$), the pure component loading ratio correlation (LRC) (Yang, "Gas Separation by Adsorption Processes, 1987) was used. The LRC isotherm equation yields an expression for $K_H$:

$$K_H = \frac{\partial\left(\frac{X_i}{X_{0_i}}\right)}{\partial P_i} = \frac{1}{n_i} K_i \frac{1}{n_i} P_i \frac{1}{n_i} - 1$$

where, $K_i$ and $n_i$ are determined from the LRC constants:

$$\ln\frac{1}{K_i} = A_{1_i} + \frac{A_{2_i}}{T}$$

$$n_i = A_{3_i} + \frac{A_{4_i}}{T}$$

The LRC constants are determined from pure component isotherm data. For $N_2$ adsorption on CaX(2.0), the LRC constants have the following values: $X_o$=3.77, A1=23.56, A2=−3151, A3=1.0 and A4=320. In selecting adsorbents for $N_2$ cleanup (region 4) in $H_2$ purification, it is only necessary to define a limiting value for $X_0 K_H$ and an upper limit $N_2$ partial pressure defining the maximum amount of $N_2$ that is likely to be found in the $H_2$ stream.

Figure 2A:
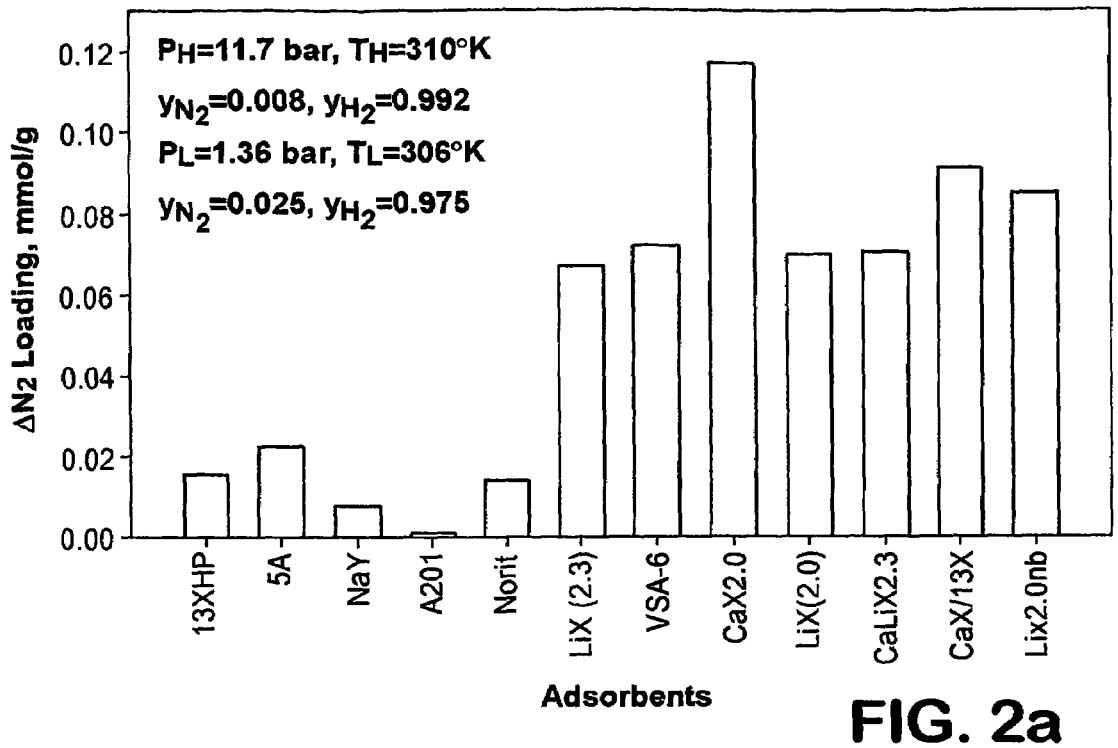
FIGS. 2a and 2b illustrates delta nitrogen loading and Henry's Law constants, respectively for various adsorbents in Region 4 of an adsorbent bed.
Figure 2B:
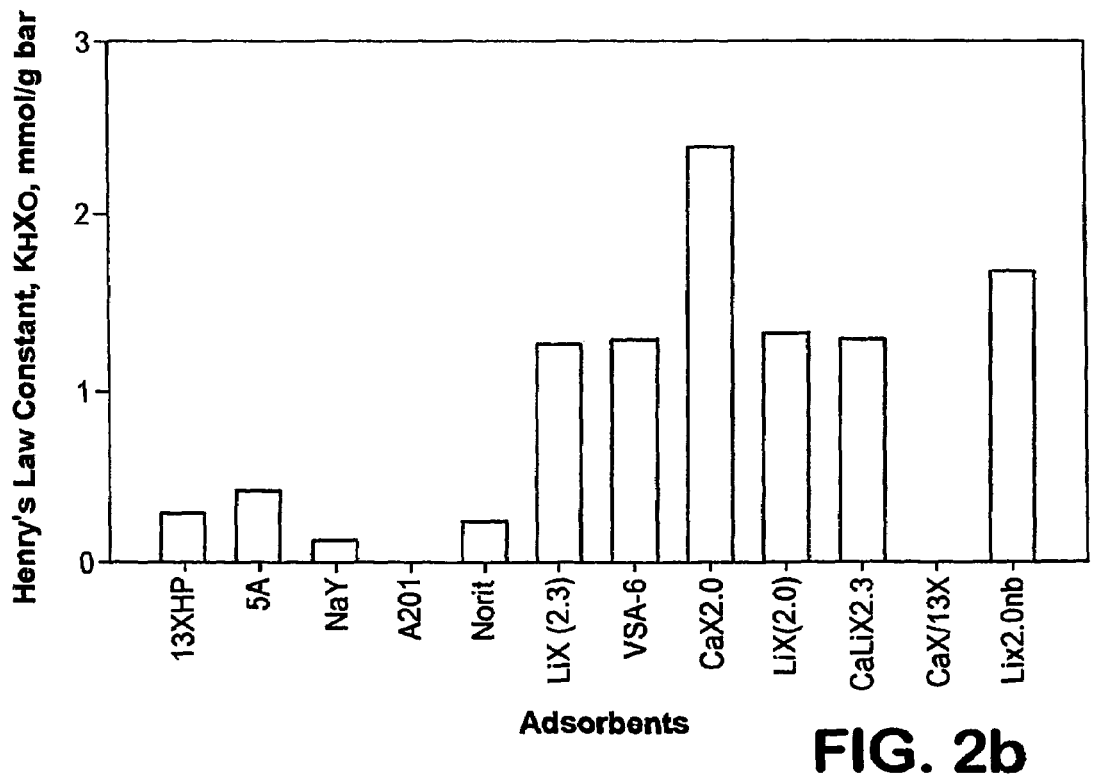
Figure 3:
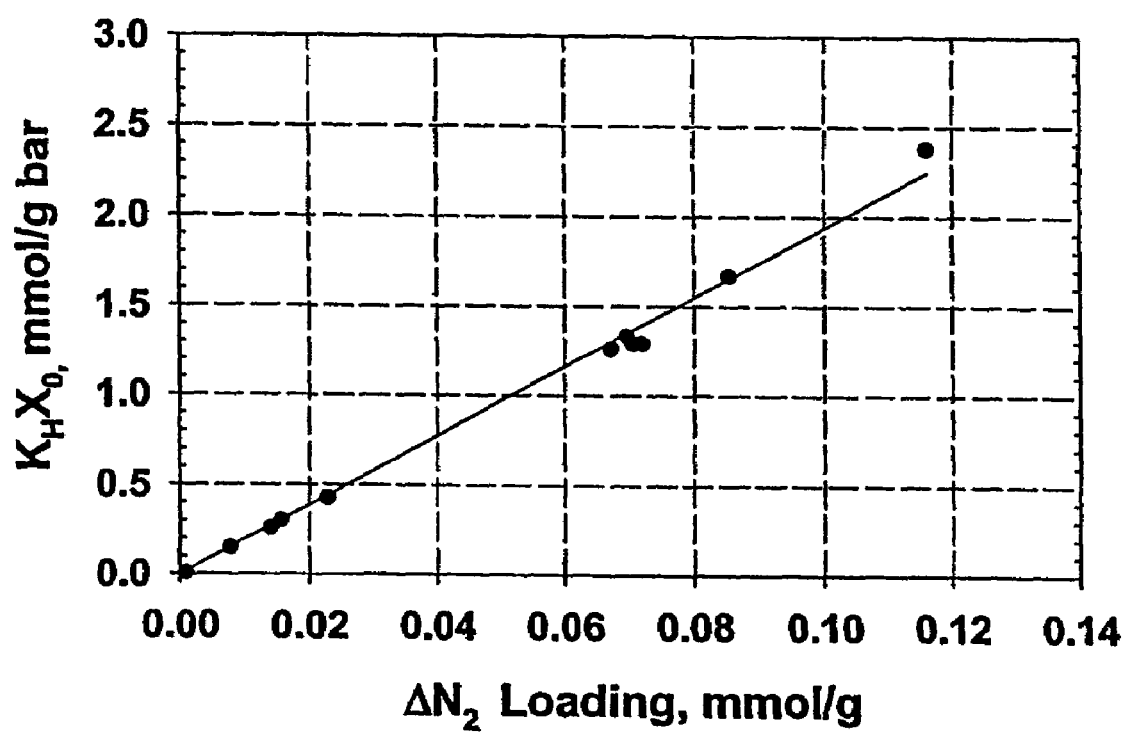
FIG. 3 shows a correlation between Henry's Law constants and Working Capacity.

PSA process simulations for $H_2$ production using adsorbents with the highest Henry's law constant provided the highest $N_2$ working capacity (i.e., required the smallest $N_2$ cleanup layer) in region 4 as shown in FIG. 2. When $N_2$ working capacity was correlated with the Henry's Law Constant of the $N_2$ isotherm, the linear correlation illustrated in FIG. 3 for conditions of 310K and $P_{N2}$=93.6 mbar was produced. The data points in FIG. 3 are from the adsorbents in FIG. 2. The largest Henry's Law Constant tested occurs for CaX (2.0) at 2.38 mmol/g bar. It is from this data that the inventive Henry's Law constant range was determined. Henry's Law constant >10 holds the adsorbate so strongly that desorption would require lower desorption pressure and/or higher desorption temperature. The result is that the purge gas and power requirement for the system would be increased to unacceptable levels.

The increased $H_2$ recovery and lower adsorbent inventory required by the PSA process of this invention is further illustrated in the examples given below. In order to compare the PSA process performance using the adsorbents of this invention with prior art, the four bed PSA system shown in FIG. 4 will be used. The valve switching logic is shown in Table 2 and details of the PSA process given in Tables 3-5. However, it should be noted that the twelve step PSA cycle is used only to illustrate the enhanced PSA process performance achieved by replacing (prior art) adsorbents with the advanced adsorbents for regions 2-4 of the bed. In addition, other PSA cycles may also be used to show the enhanced PSA process performance without deviating from the scope of this invention.

Figure 4:
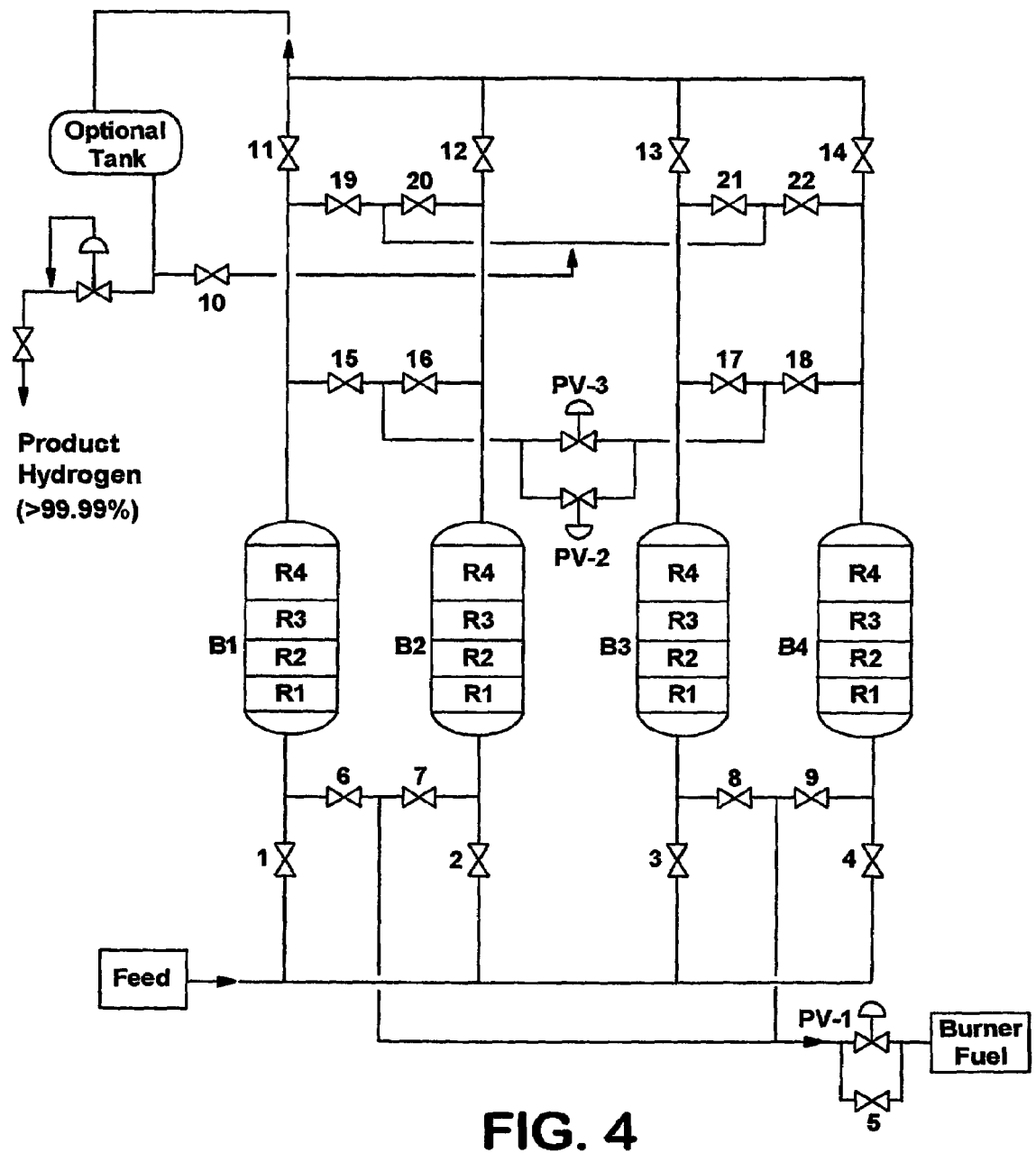
FIG. 4 shows process flow diagram for a four bed PSA system in accordance with the invention.

FIG. 4 shows four adsorbent beds (B1, B2, B3 and B4) and associated valves and conduits that will be used to illustrate the enhanced PSA process performance of this invention. Referring to FIGS. 1 and 4, one embodiment of this invention is disclosed over one complete PSA cycle, and the PSA valve switching and steps are given in Tables 2 and 3, respectively. Also, region 1 contains alumina, region 2 contains a mixture of 50% each of A201 alumina and Takeda G2X activated carbon, region 3 contains G2X activated carbon, and region 4 contains CaX(2.0).

Step 1 (AD1): Bed 1 (B1) is in the first adsorption step (AD1) at 232 psig, while Bed 2 (B2) is undergoing countercurrent blowdown (BD), Bed 3 (B3) is undergoing the first equalization falling step (EQ1DN), and bed 4 (B4) is undergoing the second pressure equalization rising step (EQ2UP).

Step 2 (AD2): Bed 1 is in the second adsorption step (AD2) and is also supplying product gas to bed 4 that is undergoing the first product pressurization (PP1) step. During the same time, beds 2, 3 and 4 are undergoing purge, cocurrent depressurization and first product pressurization, respectively.

Step 3 (AD3): Bed 1 is in the third adsorption step (AD3), and is also supplying product gas to Bed 4 that is undergoing the second product pressurization (PP2) step. During the same time period, beds 2, 3, and 4 are undergoing the first equalization rising step (EQ1UP), second equalization falling (EQ2DN), and second product pressurization step (PP2), respectively.

Step 4 (EQ1DN): Bed 1 is undergoing the first equalization falling step (EQ1DN), while bed 2 receives the gas from bed 1 and is undergoing the second equalization rising step (EQ2UP). Beds 3 and 4 are now undergoing blowdown (BD) and the first adsorption step (PP1), respectively.

Step 5 (PPG): Bed 1 is undergoing cocurrent depressurization step to provide purge gas (PPG) to bed 3, while Beds 2 and 4 are undergoing first product pressurization (PP1) and the second adsorption step (AD2), respectively.

Step 6 (EQ2DN): Bed 1 undergoes a second equalization falling step (EQ2DN) by sending low pressure equalization gas to bed 3 that is undergoing the first equalization rising (EQ1UP) step. Beds 2 and 4 are undergoing the second product pressurization (PP2) and third adsorption step, respectively.

Step 7 (BD): Beds 1 and 2 undergo the countercurrent blowdown (BD) and first adsorption (AD1) step, respectively. During this time Beds 3 and 4 are undergoing bed-to-bed equalization, i.e., Beds 3 and 4 are undergoing the second equalization rising (Eq2UP) and first equalization falling (EQ1DN) steps, respectively.

Step 8 or PG (time units 340-425 sec): Bed 1 is now receiving purge gas (PG) from Bed 4, and Beds 2 and 3 are undergoing the second adsorption step and first product pressurization (PP1) step, respectively.

Step 9 (EQ1UP): Bed 1 is undergoing the first equalization rising step (EQ1UP) by receiving low pressure equalization gas from bed 4 that is undergoing the second equalization falling step (EQ2DN). During the same time, beds 2 and 3 is undergoing the third adsorption step (AD3) and the second product pressurization (PP2), respectively.

Step 10 (EQ2UP): Bed 1 is undergoing the second equalization rising step (EQ2UP) by receiving high pressure equalization gas from bed 2 that is undergoing the first equalization falling step (EQ1DN). During the same time, Beds 3 and 4 are undergoing the first adsorption (AD1) step and countercurrent blowdown step, respectively.

Step 11 (PP1): Bed 1 is receiving first product pressurization (PP1) gas from bed 3 that is also in the second adsorption step (AD2), while Bed 2 is undergoing cocurrent depressurization step to provide purge gas (PPG) to bed 4.

Step 12 (PP2): Bed 1 is receiving second product pressurization (PP2) gas from bed 3 that is also in the third adsorption step (AD3). During the same time, Bed 2 undergoes a second equalization falling step (EQ2DN) by sending low pressure equalization gas to bed 4 that is undergoing the first equalization rising (EQ1UP) step.

A summary of the aforementioned twelve steps are given in Tables 2 and 3. In particular, Table 2 summarizes the valve sequence over one complete cycle for the four bed PSA process shown in FIG. 4, and Table 5 gives the respective time intervals and the corresponding status of each bed during one complete PSA cycle. Note from Tables 2 and 3 that the four beds operate in parallel, and during ¼ of the total cycle time one of the beds is in the adsorption step, while the other beds are either undergoing pressure equalization, purge, blowdown, or product pressurization.

TABLE 2

Four Bed H2 PSA Valve Switching (O = OPENED, C = CLOSED)

| | Step | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Bed 1 (BD1) | AD1 | AD2 | AD3 | EQ1DN | PPG | EQ2DN | BD | PG | EQ1UP | EQ2UP | PP1 | PP2 |
| Bed 2 (BD2) | BD | PG | EQ1UP | EQ2UP | PP1 | PP2 | AD1 | AD2 | AD3 | EQ1DN | PPG | EQ2DN |
| Bed 3 (BD3) | EQ1DN | PPG | EQ2DN | BD | PG | EQ1UP | EQ2UP | PP1 | PP2 | AD1 | AD2 | AD3 |
| Bed 4 (BD4) | EQ2UP | PP1 | PP2 | AD1 | AD2 | AD3 | EQ1DN | PPG | EQ2DN | BD | PG | EQ1UP |
| Valve No. | | | | | | | | | | | | |
| 1 | O | O | O | C | C | C | C | C | C | C | C | C |
| 2 | C | C | C | C | C | C | O | O | O | C | C | C |
| 3 | C | C | C | C | C | C | C | C | C | O | O | O |
| 4 | C | C | C | O | O | O | C | C | C | C | C | C |
| 5 | O | O | C | O | O | C | O | O | C | O | O | C |
| 6 | C | C | C | C | C | C | O | O | C | C | C | C |
| 7 | O | O | C | C | C | C | C | C | C | C | C | C |
| 8 | C | C | C | O | O | C | C | C | C | C | C | C |
| 9 | C | C | C | C | C | C | C | C | C | O | O | C |
| 10 | C | O | O | C | O | O | C | O | O | C | O | O |
| 11 | O | O | O | C | C | C | C | C | C | C | C | C |
| 12 | C | C | C | C | C | C | O | O | O | C | C | C |
| 13 | C | C | C | C | C | C | C | C | C | O | O | O |
| 14 | C | C | C | O | O | O | C | C | C | C | C | C |
| 15 | C | C | C | C | O | O | C | O | O | C | C | C |
| 16 | C | O | O | C | C | C | C | C | C | C | O | O |
| 17 | C | O | O | C | O | O | C | C | C | C | C | C |
| 18 | C | C | C | C | C | C | C | O | O | C | O | O |
| 19 | C | C | C | O | C | C | C | C | C | O | O | O |
| 20 | C | C | C | O | O | O | C | C | C | O | C | C |
| 21 | O | C | C | C | C | C | O | O | O | C | C | C |
| 22 | O | O | O | C | C | C | O | C | C | C | C | C |

TABLE 3

Time Interval and Step Sequence of the PSA Cycle

| Step Number | Time Interval | BED #1 | BED #2 | BED #3 | BED #4 |
|---|---|---|---|---|---|
| 1 | 0-4 | AD1 | BD | EQ1DN | EQ2UP |
| 2 | 4-8 | AD2/PP1 | PG | PPG | PP1 |
| 3 | 8-12 | AD3/PP2 | EQ1UP | EQ2DN | PP2 |
| 4 | 12-16 | EQ1DN | EQ2UP | BD | AD1 |
| 5 | 16-20 | PPG | PP1 | PG | AD2/PP1 |
| 6 | 20-24 | EQ2DN | PP2 | EQ1UP | AD3/PP2 |
| 7 | 24-28 | BD | AD1 | EQ2UP | EQ1DN |
| 8 | 28-32 | PG | AD2/PP1 | PP1 | PPG |
| 9 | 32-36 | EQ1UP | AD3/PP2 | PP2 | EQ2DN |
| 10 | 36-40 | EQ2UP | EQ1DN | AD1 | BD |
| 11 | 40-44 | PP1 | PPG | AD2/PP1 | PG |
| 12 | 44-48 | PP2 | EQ2DN | AD3/PP2 | EQ1UP |

AD1 = First Adsorption Step
AD2/PP1 = Second Adsorption Step/First product pressurization
AD3/PP2 = Third Adsorption Step/Second product pressurization
EQ1DN = First Equalization Down
PPG = Provide Purge Gas
EQ2DN = Second Equalization Down
BD = Blowdown
PG = Purge
EQ1UP = First Equalization Up
EQ2UP = Second Equalization Up
PP1 = First Product Pressurization
PP2 = Second Product Pressurization Table 4 gives an example of the operating conditions and the PSA process performance using alumina in region 1, a mixture of 50% each of A201 alumina and G2X activated carbon in region 2, G2X in region 3, and CaX(2.0) in the region 4 in the bed. This example is hereafter referred to as IV2.

Table 5 gives an example of the operating conditions and the PSA process performance using alumina in region 1, high bulk density (>38 lb/ft$^3$) G2X activated carbon in regions 2&3, and VSA6 in the fourth region in the bed. This example is hereafter referred to as IV1.

Table 6 (Prior Art) gives an example of the operating conditions and the PSA process performance using alumina in region 1, low bulk density (<38 lb/ft$^3$) activated carbon in regions 2&3, and 5A zeolite in the fourth region in the bed. This example is hereafter referred to as PA.

In the tables, the symbols have the following meaning: TPD=ton (2000 lb) per day of hydrogen, kPa=1000 Pa=S.I. unit for pressure (1.0 atm.=14.696 psi=0.0 psig=1.01325 bars=101.325 kPa), s=time unit in seconds.

Table 4 (IV2): Four Bed PSA process performance (SMR feed) using alumina in the first region in the bed, a mixture of 50% A201 alumina and G2X activated carbon in the second region, G2X activated carbon in the third region, and CaX (2.0) in the fourth region (top). The results shown below correspond to PSA process modeling using a feed mixture of 75.83% $H_2$, 0.72% $N_2$, 3.35% $CH_4$, 2.96% CO, and 17.14% $CO_2$. The adsorption pressure is 232 psig, the desorption pressure is 4.4 psig, and twelve steps (see Tables 2 and 3) are used in the four bed PSA cycle. Further details of the four bed PSA process are given below.

| | |
|---|---|
| Cycle Time(s): | 48 sec. |
| Adsorbent (region 1): | Alumina |
| Bulk Density (Alumina): | 49.0 lb/ft$^3$ |
| Amount of Alumina: | 74.65 lb$_m$/TPD $H_2$ |
| Adsorbent (region 2): | Mixture (50% each of A201 alumina and G2X) |
| Bulk Density: | 43 lb/ft$^3$ |
| Amount of Mixture: | 110 lb$_m$/TPD $H_2$ |
| Adsorbent (region 3): | Takeda G2X activated carbon |
| Bulk Density: | 39.0 lb/ft$^3$ |
| Amount of G2X: | 112 lb$_m$/TPD $H_2$ |
| Adsorbent (region 4): | CaX(2.0) |
| Bulk Density (CaX(2.0): | 41.33 lb/ft$^3$ |
| Amount of CaX(2.0): | 137.38 lb$_m$/TPD $H_2$ |
| High Pressure: | 232 psig |
| Low Pressure: | 4.4 psig |
| Temperature: | 311 K |
| Feed Rate: | 65,778 SCFH |
| Product Rate: | 42,000 SCFH |
| Total BSF | 434.05 lb$_m$/TPD H2 (SMR/IV2) |
| IV2 VS PA | 100 * (850.85 − 434.05)/850.85 = 49% BSF Red. |
| H2 Purity: | 99.99% |
| H2 Rec. | 84% (10.53% Higher $H_2$ recovery versus PA) |

Table 5 (IV1): Four Bed PSA process performance (SMR feed) using alumina in the first region in the bed, high bulk density (>38 lb$_m$/ft$^3$) G2X activated carbon in the regions 2 &3, and VSA6 zeolite in the fourth region (top). The results shown below correspond to PSA process modeling using a feed mixture of 75.83% $H_2$, 0.72% $N_2$, 3.35% $CH_4$, 2.96% CO, and 17.14% $CO_2$. The adsorption pressure is 232 psig, the desorption pressure is 4.4 psig, and twelve steps see Table 2 and 3) are used in the four bed PSA cycle. Further details of the six bed PSA process are given below.

| | |
|---|---|
| Cycle Time(s): | 48 sec. (4.0 sec for each step) |
| Adsorbent (region 1): | Alumina |
| Bulk Density (Alumina): | 49.0 lb/ft$^3$ |
| Amount of Alumina: | 78.26 lb$_m$/TPD $H_2$ |
| Adsorbent (regions 2&3): | Takeda G2X activated carbon |
| Bulk Density: | 39 lb/ft$^3$ |
| Amount of G2X: | 278.02 lb$_m$/TPD $H_2$ |
| Adsorbent (region 4): | VSA6 |
| Bulk Density (VSA6): | 41.33 lb/ft$^3$ |
| Amount of VSA6: | 188.06 lb$_m$/TPD $H_2$ |
| High Pressure: | 232 psig |
| Low Pressure: | 4.4 psig |
| Temperature: | 311 K |
| Feed Rate: | 69,234 SCFH |
| Product Rate: | 42,000 SCFH) |
| Total BSF | 544.34 lb$_m$/TPD H2 (SMR feed case/IV1) |
| IV1 VS PA | 100 * (850.85 − 544.34)/850.85 = 36.02% BSF Red. |
| H2 Purity: | 99.98% |
| H2 Rec. | 80% (5.3% Higher $H_2$ recovery versus PA) |

Table 6 (Prior Art, i.e. PA): An example of the operating conditions and the PSA process performance using alumina, activated carbon and 5A zeolite in the three layer bed and the four bed PSA process of FIG. 4. The results shown below were obtained from PSA simulation results using a feed mixture on a dry basis: 75.83% $H_2$, 17.14% $CO_2$, 2.96% CO, 3.35% $CH_4$ and 0.72% $N_2$. Also, in the table, total bed size factor is the total quantity of adsorbents per ton per day of $H_2$ produced.

| | |
|---|---|
| Cycle time (s) | 60 |
| Adsorbent (region 1) | Alumina |
| Amount of alumina (lb/TPD $H_2$): | 122.32 |
| Adsorbent (regions 2 & 3): | activated carbon |
| Amount of activated carbon | 434.58 |

-continued

| | |
|---|---|
| lb/TPD H$_2$): | |
| Adsorbent in (region 4): | 5A zeolite |
| Amount of 5A zeolite (lb/TPD H$_2$): | 293.93 |
| High Pressure: | 232 psig |
| Low Pressure: | 4.4 |
| Feed Rate: | 72,025 SCFH |
| Product Rate: | 42,000 SCFH |
| Hydrogen Purity: | 99.9% |
| Hydrogen Recovery: | 76.9% |
| Total Bed Size Factor (lb/TPD H$_2$): | 851 |
| Temperature: | 311 K |

It should be recognized that the aforementioned examples utilized similar operating PSA process conditions to illustrate the enhanced performance using CaX(2.0), VSA6 and high bulk density activated carbon relative to prior art PSA processes using 5A zeolite. Other embodiments which use more or less adsorbers in the PSA cycle could easily be designed by those skilled in the art without deviating from the scope of this invention.

Figure 5:
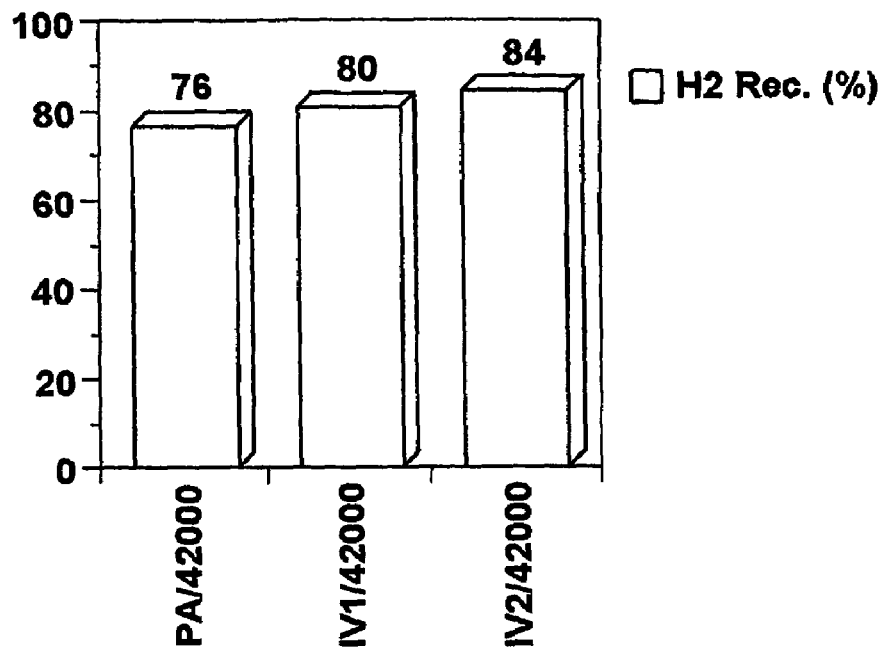
FIG. 5 shows comparisons between hydrogen recovery and bed size factor for various processes examples.
Figure 5:
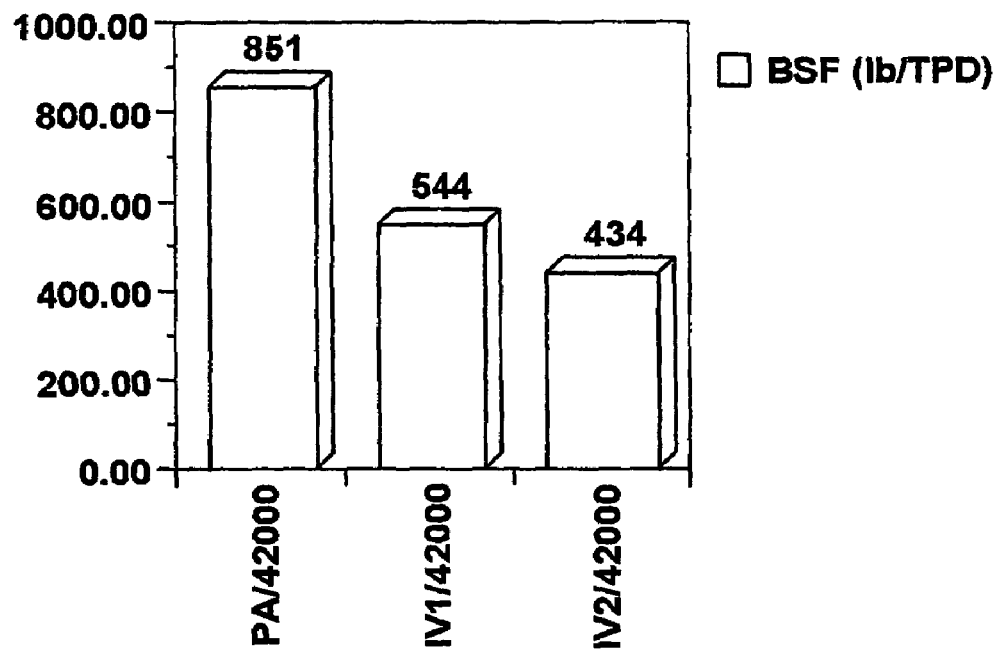

FIG. 5 compares the PSA process performance, obtained via computer simulations, using the PSA processes of Tables 4-6. Note that in the upper drawing of FIG. 5, that for about the same H$_2$ purity (99.99%), the H$_2$ recovery using 5A zeolite (PA) is about 76% (Table 6). By using the adsorbents of this invention, the H$_2$ recovery is about 80% (Table 5, i.e., IV1), and 84% (Table 4, i.e., IV2), respectively. The lower diagram of FIG. 5 shows the total bed size factor (BSF, lb/TPDH$_2$) obtained using each of the aforementioned adsorbents and the PSA processes of Tables 4-6.

Figure 6:
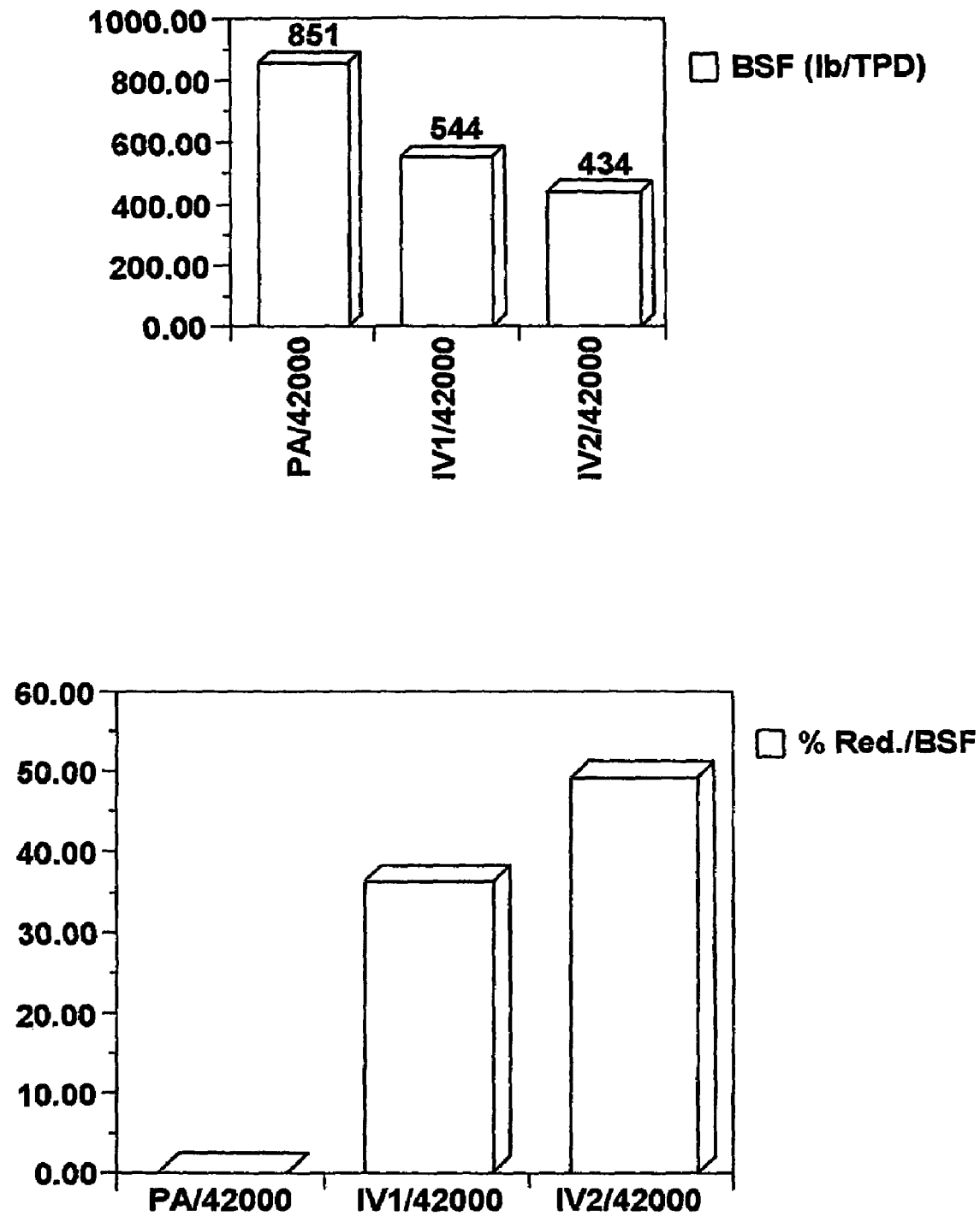
FIG. 6 shows comparisons of processes disclosed in the Examples in terms of bed size factor.

FIG. 6 shows the total bed size factor (BSF, lb/TPDH$_2$) obtained using each of the aforementioned adsorbents and the PSA processes of Tables 4-6. The lower diagram shows the percentage reduction in bed size factor of this invention (IV1 & IV2) relative to the prior art (PA). Note that IV1 gives about 35% reduction over the prior art (PA) and IV2 gives about 50% reduction in the bed size factor relative to the prior art (PA). The 50% reduction in bed size factor in IV2 implies that IV2 needs only half the adsorbent inventory relative to the prior art (PA) process.

Variations of the invention are also contemplated. For example, the region/layer of each bed could be replaced with multiple layers of different adsorbents. For example, the adsorbent layer could be substituted by a composite adsorbent layer containing different adsorbent materials positioned in separate zones in which temperature conditions favor adsorption performance of the particular adsorbent material under applicable processing conditions in each zone. Further details on composite adsorbent layer design is given by Notaro et al., U.S. Pat. No. 5,674,311.

Further, consideration of the dynamic or rate effects may achieve enhanced PSA process performance. In particular, the adsorbents selected for regions 2-4 of the bed could be improved by using higher rate adsorbents in those regions. Also, higher surface area/higher porosity adsorbent and/or smaller particles would provide higher adsorption/desorption kinetics. In addition, in region 4 of the bed, a higher rate material such as binderless LiX(2.0) would be desirable. This material could be placed in the entire zone (region 4) or on top of region 4. The adsorbent used in region 4 of the bed (e.g., CaX) could be caustically digested (c.d.) to produce adsorbents with different adsorption/desorption rates. Also, smaller particles may also be employed here as well to improve rate. Adsorbents having diameters in the range of 0.5-2.0 mm are preferred in regions 2-4 of the bed in the practice of this invention.

Although the above PSA processes are discussed in relation to H$_2$ production, the recommended adsorbents may also be applicable to other separation processes. Examples include helium recovery from natural gas or cryogenic sources (e.g., NRU/HRU), CO$_2$ production from synthesis gas, or in other PSA processes to produce H$_2$ and CO, or H$_2$ and CO$_2$ from various mixtures containing these components. In addition the PSA process of this invention could also be used with hydrogen containing feed gas that contains additional impurities such as oxygen and argon.

Specific features of the invention are shown in one or more of the drawings for convenience only, as each feature may be combined with other features in accordance with the invention. Alternative embodiments will be recognized by those skilled in the art and are intended to be included within the scope of the claims.

What is claimed is:

1. An adsorbent bed comprising:
   a) a first layer of adsorbent adapted for the removal of water;
   b) a second layer of adsorbent comprising a mixture of adsorbents, wherein at least one component of the said mixture has a bulk density of greater than or equal to 32 lb/ft$^3$;
   c) a third layer of adsorbent comprising an adsorbent having a bulk density of greater than or equal to 32 lb/ft$^3$; and
   d) a fourth layer of adsorbent having a N$_2$ Henry's Law constant of greater than 1.5 mmol/g.bar.

2. The adsorbent bed of claim 1 wherein said first layer of adsorbent is selected from the groups consisting of alumina, silica gel, silicalite and zeolites; said second layer of adsorbents comprising a mixture of alumina with activated carbon or zeolite; said third layer of adsorbent comprising activated carbon.

3. The adsorbent bed of claim 1, wherein said fourth layer of adsorbent is selected from the group consisting of VSA-6, KE-H650, KE-J407, CaX(2.0), LiX(2.0) (>86% Li), LiCaX (2.0) and binderless LiX(2.0) (>86% Li), where (2.0) refers to the SiO$_2$/Al$_2$O$_3$ ratio.

4. The adsorbent bed of claim 1, wherein said mixture of step b) contains activated carbon that has a bulk density of at least 38 lb/ft$^3$ and wherein fourth layer of adsorbent has a N$_2$ Henry's Law constant of at least 2.3 mmol/g.bar.

5. The adsorbent bed of claim 1 wherein the zeolite in the second layer is X zeolite, and wherein said adsorbent bed is used for hydrogen purification.

6. A process for the purification of a gas stream containing more than 50 mole % hydrogen and impurities including water, CO$_2$, CH$_4$, Co and N$_2$, said process comprising passing said gas stream over a bed of adsorbent, wherein said bed of adsorbent comprises at least 4 layers, the first layer selected from the group consisting of silica gel, silicalite, zeolite and alumina, the second layer of activated carbon or zeolite and alumina, the third layer of activated carbon and a fourth layer of adsorbent having a N$_2$ Henry's Law constant of at least 1.5 mmol/g.bar.

7. The process of claim 6, wherein the activated carbon in said second layer has a bulk density of greater than or equal to 38 lb/ft$^3$.

8. The process of claim 6, wherein said $N_2$ Henry's Law constant at least 2.3 mmol/g.bar.

9. The process of claim 6 wherein said fourth layer of adsorbent is selected from the group consisting of VSA-6, KE-H650, KE-J407, CaX(2.0), LiX(2.0) (>86% Li), LiCaX (2.0) and binderless LiX(2.0) (>86% Li), where (2.0) refers to the $SiO_2/Al_2O_3$ ratio.

10. The process of claim 6 wherein the activated carbon in the second layer is an impregnated activated carbon having a bulk density of at least 32 $lb/ft^3$.

* * * * *